(12) United States Patent
Reddy (10) Patent No.: US 8,909,232 B2
(45) Date of Patent: Dec. 9, 2014

(54) MOBILE UNIT HAVING INTERNET PROTOCOL FUNCTIONALITY

(71) Applicant: Intel Corporation, Santa Clara, CA (US)

(72) Inventor: Gautam G. Reddy, Montclair, NJ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/744,258

(22) Filed: Jan. 17, 2013

(65) Prior Publication Data

US 2013/0137437 A1    May 30, 2013

Related U.S. Application Data

(63) Continuation of application No. 12/646,491, filed on Dec. 23, 2009, now Pat. No. 8,364,198, which is a continuation of application No. 10/441,432, filed on May 20, 2003, now Pat. No. 7,640,038.

(60) Provisional application No. 60/382,361, filed on May 22, 2002.

(51) Int. Cl.
*H04W 36/14* (2009.01)

(52) U.S. Cl.
USPC .......................................... 455/437; 455/558

(58) Field of Classification Search
USPC .................. 455/411, 419, 551, 552.1, 558
See application file for complete search history.

(56) References Cited

U.S. PATENT DOCUMENTS

| | | | |
|---|---|---|---|
| 5,729,537 A | 3/1998 | Billstrom | |
| 6,154,664 A | 11/2000 | Chorey et al. | |
| 6,185,204 B1 | 2/2001 | Voit | |
| 6,233,458 B1 | 5/2001 | Haumont et al. | |
| 6,295,457 B1 | 9/2001 | Narayanaswamy | |
| 6,542,521 B1 | 4/2003 | Fjortoft et al. | |
| 6,549,773 B1 | 4/2003 | Linden et al. | |
| 6,553,219 B1 | 4/2003 | Vilander et al. | |
| 6,591,098 B1 | 7/2003 | Shieh et al. | |
| 6,693,886 B1 | 2/2004 | Haikonen et al. | |
| 6,847,632 B1 | 1/2005 | Lee et al. | |
| 7,313,631 B1 | 12/2007 | Sesmun et al. | |
| 2002/0042289 A1 | 4/2002 | Kabatek | |
| 2002/0142805 A1 | 10/2002 | Pecen et al. | |
| 2002/0147008 A1 | 10/2002 | Kallio | |

FOREIGN PATENT DOCUMENTS

| | | |
|---|---|---|
| EP | 1 052 824 | 11/2000 |
| EP | 1 059 791 | 12/2000 |
| GB | 2 327 570 | 1/1999 |
| WO | 98/57474 | 12/1998 |
| WO | 00/62484 | 10/2000 |
| WO | 00/74319 | 12/2000 |
| WO | 01/19053 | 3/2001 |

OTHER PUBLICATIONS

"Bluetooth tri-band GPRS mobile phone-R520", China Academic Journal, p. 17, Oct. 2000.
"Combination of cdma2000, W-CDMA, and mobile IP technology", China Academic Journal, pp. 29-31, Sep. 2001.

*Primary Examiner* — Sam Bhattacharya
(74) *Attorney, Agent, or Firm* — Blakely, Sokoloff, Taylor & Zafman LLP (57) ABSTRACT

A mobile unit includes a handset and a removable storage module having a unique storage module identity, for storing information specific to a user, including an Internet Protocol (IP) address. Additional information regarding a Public Land Mobile Network (PLMN) and International Mobile Subscriber Identity (IMSI) which uniquely identifies the subscriber is also stored in the removable storage module. Upon successfully camping on a cell of a mobile network, the IP address is forwarded to an IP-based network capable of communicating with the mobile unit. In an alternate embodiment, the mobile unit has multi-network capabilities which allow it to communicate with an IP-based network and a cellular network at the same time. In another embodiment, existing cellular network services for the mobile unit having multi-network capabilities are routed through the IP-based network.

18 Claims, 6 Drawing Sheets

MOBILE UNIT HAVING INTERNET PROTOCOL FUNCTIONALITY

CROSS REFERENCE TO RELATED APPLICATION

This application is a continuation of, and claims priority from, U.S. patent application Ser. No. 12/646,491, filed Dec. 23, 2009, which is to issue as U.S. Pat. No. 8,364,198 on Jan. 29, 2013, which claims priority from, U.S. patent application Ser. No. 10/441,432, filed on May 20, 2003, which issued as U.S. Pat. No. 7,640,038 on Dec. 29, 2009, which claims priority from U.S. Provisional Application No. 60/382,361, filed on May 22, 2002, which is incorporated by reference as if fully set forth herein.

FIELD OF THE INVENTION

The present invention is related to the identification of users of wireless equipment. More specifically, such wireless equipment may be identified using an Internet Protocol (IP) address stored therein to access an IP-based network.

BACKGROUND

In GSM (Global System for Mobile communications) systems, a mobile station (MS) consists of a wireless terminal (i.e., handset) and a removable smart card called a Subscriber Identity Module (SIM). In $3^{rd}$ Generation (3G) Universal Mobile Telecommunication Systems (UMTSs), User Equipment (UE) consists of mobile equipment (ME) and a removable smart card called the UMTS Subscriber Identity Module (USIM). The ME communicates with a UMTS Terrestrial Radio Access Network (UTRAN) node, which in turn, may establish a connection to a Circuit Switched (CS) or Packet Switched (PS) Core network.

An International Mobile Equipment Identity (IMEI) uniquely identifies the mobile equipment. The SIM or USIM card contains an International Mobile Subscriber Identity (IMSI) which uniquely identifies the subscriber. The IMEI and the IMSI are independent, thereby allowing personal mobility.

In the case of 3G UMTSs, a base station controller corresponds to a radio network controller (RNC). There, a plurality of base stations are controlled by a node B, which in turn has a connection to the RNC.

The SIM or the USIM provides personal mobility so that a user can have access to subscribed services irrespective of a specific terminal. By inserting the SIM card into another GSM or 3G terminal, the user is able to receive calls, make calls and receive other subscribed services from that terminal.

Figure 1:
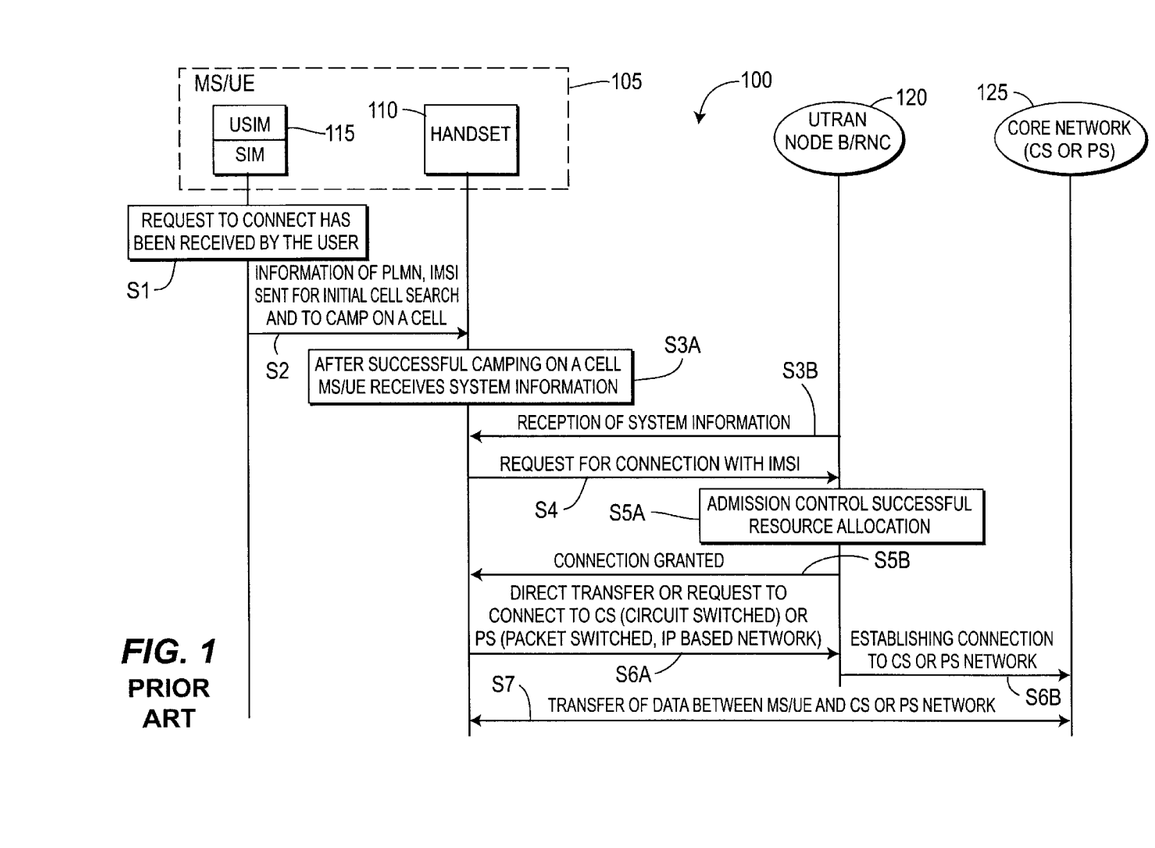
FIG. 1 shows a conventional 3G UMTS which includes a typical MS or UE.

FIG. 1 shows a conventional 3G UMTS 100 which includes a typical MS or UE 105 having a handset 110 with a respective USIM or SIM card 115 inserted therein. The USIM or SIM card 115 stores Public Land Mobile Network (PLMN) information and IMSI information. When a request to connect the MS 110 is received (by dialing or receiving a call) (S1), the PLMN and IMSI information is transferred from the USIM or SIM card 115 to the handset 110 for facilitating an initial cell search and to camp on the cell determined from the search (S2). A communication link between the MS or UE 105 and a UTRAN node 120 is established, and system information is sent from the UTRAN node 120 to the MS or UE 105 (S3A, S3B). In response, the MS or UE 105 sends a connection request including the stored IMSI information to the UTRAN node 120 (S4). Once the connection is granted by the UTRAN node 120 (S5A, S5B), the MS or UE 105 may be used to request a transfer and/or connection to a CS or PS Core network 125 (S6A, S6B). Once the MS or UE 105 is connected to the Core network 125 (S6B), data may be transferred between the Core network and the MS or UE 105 (S7).

Protocol enhancements, specified by 3GPP TS 23.003, allow transparent routing of IP datagrams to mobile nodes in the Internet. An IP datagram is the fundamental unit of information passed across any network utilizing the Internet protocol. An IP datagram contains source and destination addresses, along with data and a number of fields that define such things as the length of the datagram, the header checksum and flags that indicate whether the datagram can be (or has been) fragmented.

Each mobile node is always identified by its home address, regardless of its current point of attachment to the Internet. A mobile node is a host or router that changes its point of attachment from one network or sub-network to another. A mobile node may change its location without changing its IP address. Thus, a mobile node may continue to communicate with other Internet nodes at any location using its constant IP address, assuming link-layer connectivity to a point of attachment is available.

When located away from its home, a mobile node is also associated with a care-of address, which provides information about its current point of attachment to the Internet. The care-of address is the termination point of a tunnel toward a mobile node. A tunnel is the path followed by a datagram while it is encapsulated. A foreign agent care-of message is an address of a foreign agent with which the mobile node is registered. A co-located care-of message is an externally obtained local address which the mobile node has associated with one of its own network interfaces.

The protocol provides for registering the care-of address with a home agent. A home agent is a router on a mobile node's home network which tunnels data grams for delivery to the mobile node when it is away from home, and maintains current location information for the mobile node. The home agent sends data grams destined for the mobile node through a tunnel to the care-of address. After arriving at the end of the tunnel, each datagram is then delivered to the mobile node.

In Internet routing, a care-of address is a temporary IP address for a mobile node (mobile device) that enables message delivery when the device is connecting from somewhere other than its home network. The care-of address identifies a mobile node's current point of attachment to the Internet and makes it possible to connect from a different location without changing the device's home address (permanent IP address). This works similarly to the way the postal system might forward letters through a care-of address: messages sent to the known permanent address are rerouted to the care-of address while the recipient can be reached there. Thus, the recipient avoids having to change their official address to the temporary one when they change their location, and change it back again when they return home.

When a mobile device is away from its home network, it is assigned a care-of address. This may be a foreign agent care-of address, which is the static IP address of a foreign agent on a visited network, or a co-located care-of address, which is a temporary IP address assigned to the mobile node. A co-located care-of address may be acquired through some means such as Dynamic Host Configuration Protocol (DHCP), or may be a longer-term address assigned a device for connecting through a specific foreign network. Mobile IP, as defined in the Internet Engineering Task Force (IETF) RFC 2002 specifications, registers the care-of address with a home agent which resides on the home network. When a message for the mobile node is delivered to the home network, the home agent intercepts the message and tunnels it to the recipient at the care-of address.

UEs can only be operated if a valid IMSI is present. An IMSI is primarily intended for obtaining PLMN information by subscribers for individual charging purposes. Current cellular systems, however, do not address the use of an MS or UE in the context of an IP-based network. As the use of IP-based networks becomes ubiquitous, the lack of IP-enabled functionality will present a problem for many MS or UE users.

SUMMARY

As cellular systems move towards incorporating the features of an IP-based network, it is important to improve the functionality of an MS or UE (hereinafter "mobile unit") with an IP address. The present invention identifies the mobile unit by an IP address stored in a SIM, USIM or any smart card that is being used in the mobile unit. Examples of the type of IP addresses covered are IPv4, IPv6 and care of addresses used in Mobile IP.

In a preferred embodiment, the mobile unit includes a handset and a removable storage module (e.g., SIM, USIM). The handset has a unique handset identity for transmitting, receiving and processing wireless communications. The removable storage module has a unique storage module identity for storing information specific to a user, including an IP address. Furthermore, the removable storage module may store PLMN information, IMSI information and User information. The handset selectively transmits such information to one or more networks for establishing a communications link with the networks.

The removable storage unit of the mobile unit may use the IMSI information and the IP address to access both an IP-based network and a cellular network at the same time, thus allowing a user of the mobile to access the cellular network for carrying out voice communications while querying an IP-based network for data.

Alternatively, the mobile unit may drop an established connection with one first network and route existing services associated with the first network through a second network.

DETAILED DESCRIPTION OF THE PREFERRED EMBODIMENTS

Figure 2:
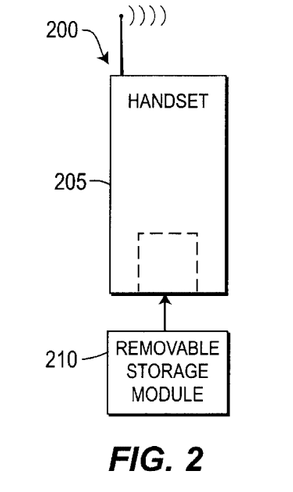
FIG. 2 shows a mobile unit including a handset and a removable storage module configured in accordance with a preferred embodiment of the present invention.

FIG. 2 shows a mobile unit 200 that is assigned an IP address which permits the mobile unit 200 to operate if the IP address is valid. The IMSI and the IP address can coexist in the mobile unit 200, which can be identified by either an IMSI, an IP address or both.

The mobile unit 200 includes a handset 205 having a unique handset identity for transmitting, receiving and processing wireless communications. The mobile unit 200 further includes a removable storage module 210, having a unique storage module identity, which stores information specific to a user.

Figure 3:
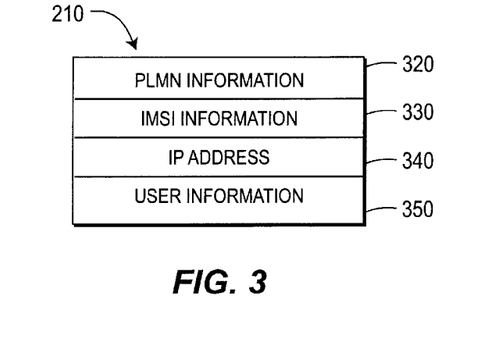
FIG. 3 illustrates the types of information stored in the removable storage module of FIG. 2.

Referring to FIG. 3, the stored information in the removable storage module 210 includes an IP address 340. The IP address 340 is used to gain access to an IP-based network for facilitating the transfer of data to and from the IP-based network. The stored information further includes PLMN information 320, IMSI information 330 and User information 350. The removable storage module 210 may be a Subscriber Identity Module (SIM), a Universal Mobile Telecommunication System (UMTS) Subscriber Identity Module (USIM) or any other type of smart card.

Figure 4:
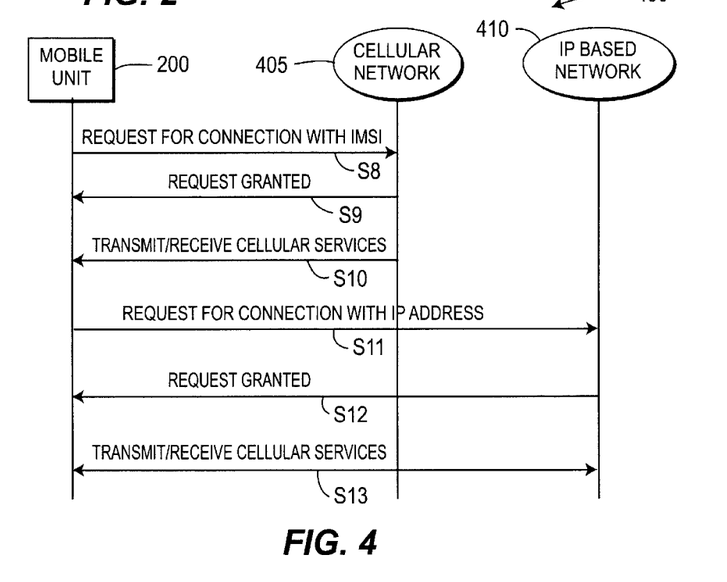
FIG. 4 is a system diagram illustrating how the mobile unit of FIG. 2 communicates with a cellular network and an IP-based network in accordance with one embodiment of the present invention.

FIG. 4 shows a system 400 including at least one mobile unit 200, a cellular network 405 and an IP-based network 410. The mobile unit 200 selectively transmits an IP address 340 and IMSI information 330, stored in the removable storage module 210 (shown in FIG. 2) of the mobile unit 200, to one or more networks, such as a cellular network 405 and an IP-based network 410. The mobile unit 200 has multi-network capabilities allowing it to communicate with the IP-based network 410 and the cellular network 405 at the same time. The mobile unit 200 communicates with the cellular network 405, via a connection established using the IMSI information 330 (S8, S9), to transmit and receive cellular services (S10). The mobile unit 200 communicates with the IP-based network 410 (S11, S12) using the IP address to transmit and receive IP data services (S13). In one embodiment, the connection established with the cellular network 405 may be dropped and the existing cellular network services may be provided through the IP-based network 410. In another embodiment, mobile unit 200 may simultaneously communicate with the cellular network 405 and the IP-based network 410. Alternatively, mobile unit 200 may communicate with a wireless local area network (LAN), rather than IP-based network 410.

Figure 5:
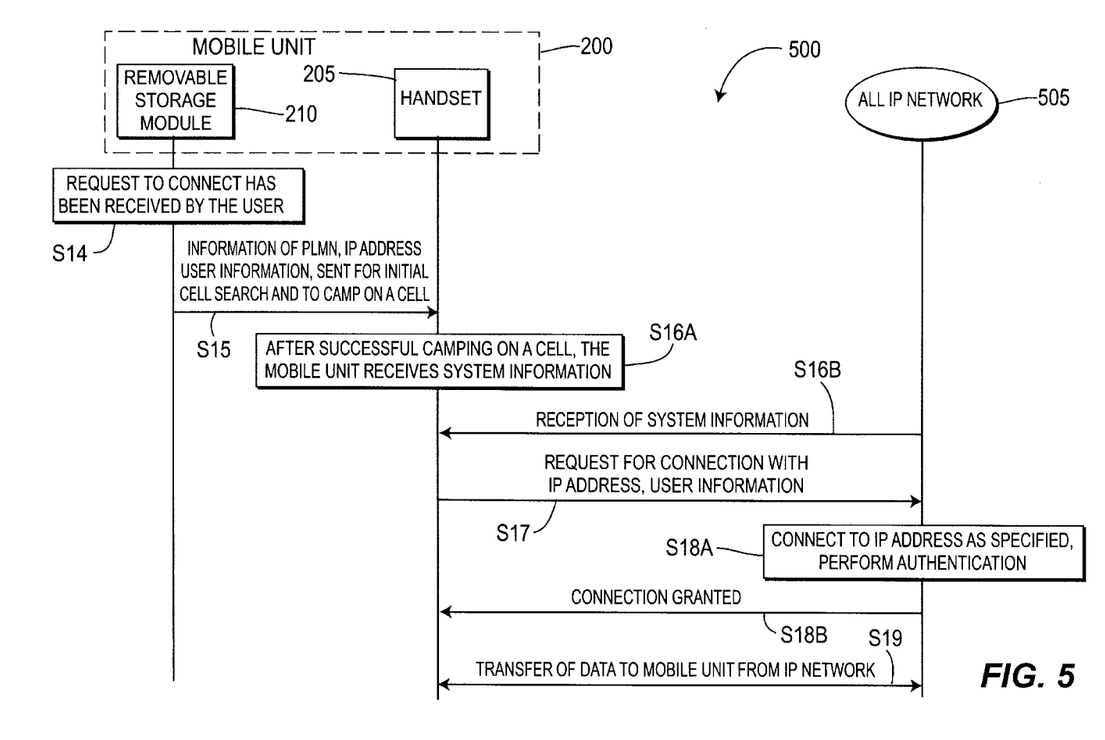
FIG. 5 is a system diagram illustrating how the mobile unit of FIG. 2 communicates with an All IP network in accordance with one embodiment of the present invention.

FIG. 5 shows a system 500 including at least one mobile unit 200 and an All IP network 505 capable of exchanging messages with the mobile unit 200. The mobile unit 200 has stored therein an IP address which allows the mobile unit to connect to the All IP network 505 without going through a cellular network, provided the mobile unit is able to access the IP network at the physical layer. When a request to connect the mobile unit 200 is received (by dialing or receiving a call) (S14), the PLMN information 320, IP address 340 and User information 350 are transferred from the removable storage module 210 to the handset 205 for facilitating an initial cell search and to camp on the cell determined from the search (S15). A communication link between the mobile unit 200 and the All IP network 505 is established, and system information is sent from the All IP network 505 to the mobile unit 200 (516A, 516B). In response, the mobile unit 200 sends a connection request including the stored IP address 340 and User information 350 to the All IP network 505 (S17). Once the connection is granted by the All IP network 505 (518A, 518B), the transfer of data between the mobile unit 200 and the All IP network 505 may commence (S19).

Figure 6:
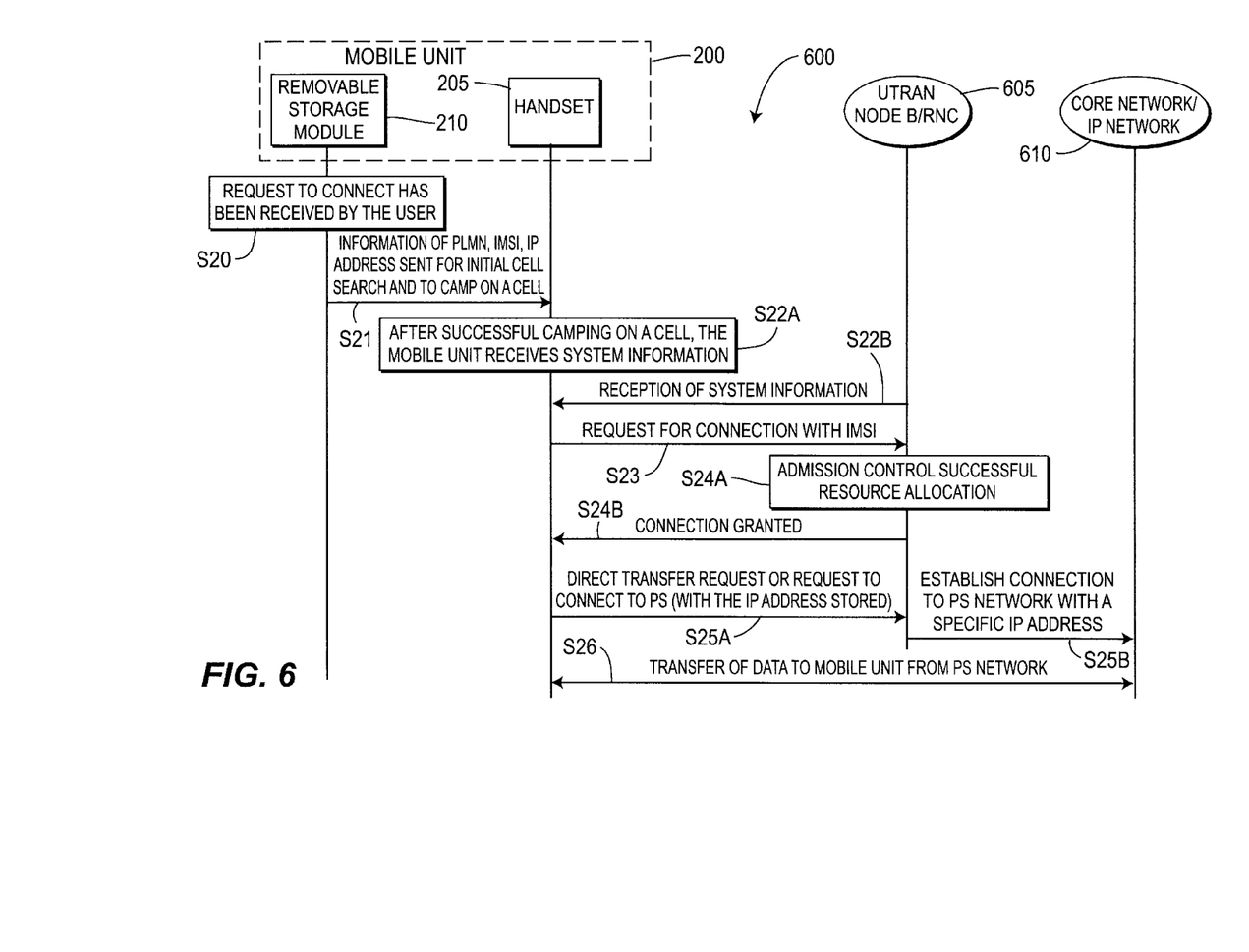
FIG. 6 is a system diagram illustrating how the mobile unit of FIG. 2 communicates with a UTRAN node and Core network/IP network in accordance with one embodiment of the present invention.

FIG. 6 shows a system 600 including at least one mobile unit 200, a UTRAN node 605 and a Core network/IP network 610. When a request to connect the mobile unit 200 is received (by dialing or receiving a call) (S20), the PLMN information 320, IMSI information 330 and IP address 340 are transferred from the removable storage module 210 to the handset 205 for facilitating an initial cell search and to camp on the cell determined from the search (S21). A communication link between the mobile unit 200 and the UTRAN node 605 is established, and system information is sent from the UTRAN node 605 to the mobile unit 200 (S22A, S22B). In response, the mobile unit 200 sends a connection request including the stored IMSI information 330 to the UTRAN node 605 (S23). Once the connection is granted by the UTRAN node 605 (S24A, S24B), the mobile unit 200 may be used to request a transfer and/or connection to the CS or PS Core network/IP network 610 (S25A, S25B), whereby the UTRAN node 605 forwards the IP address 340 to the Core network/IP network 610 (S25B). Once the mobile unit 200 is connected to the Core network/IP network 610, data may be transferred between the Core network/IP network 610 and the mobile unit 200 (S26).

Figure 7:
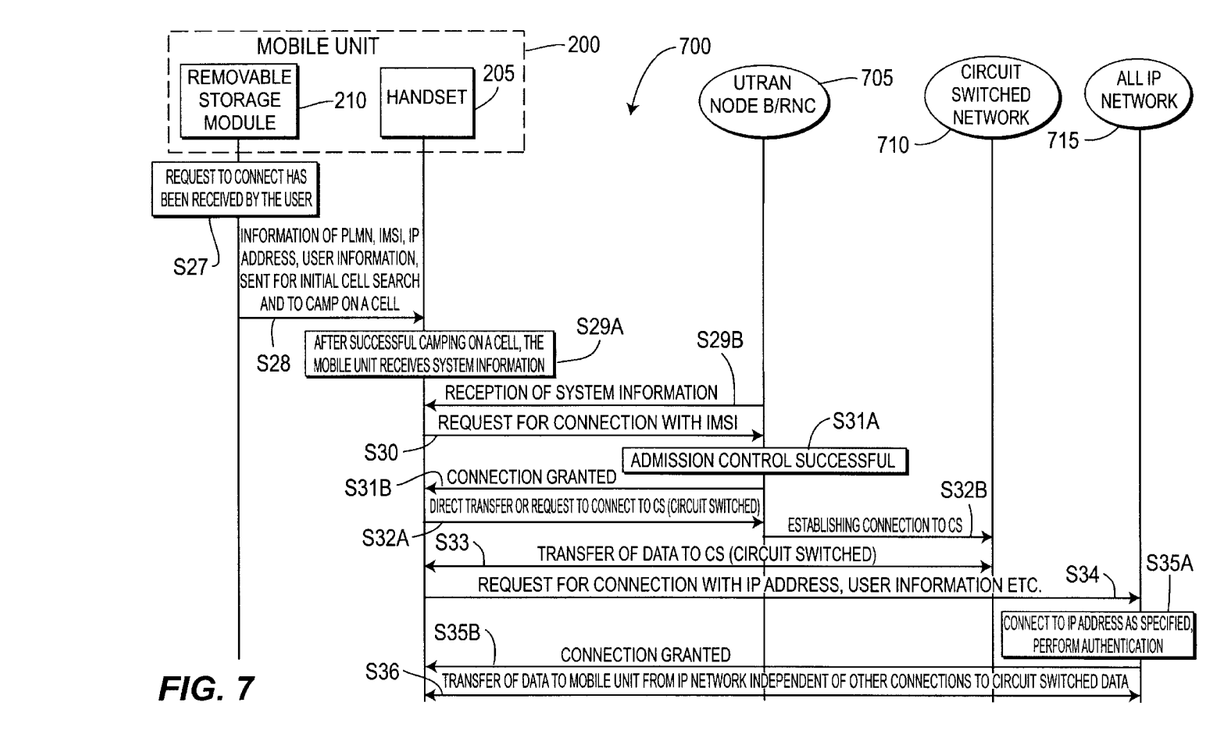
FIG. 7 is a system diagram illustrating how the mobile unit of FIG. 2 communicates with a UTRAN node, Circuit Switched network and All IP network in accordance with one embodiment of the present invention.

FIG. 7 shows a system 700 including at least one mobile unit 200, a UTRAN node 705, a Circuit Switched network 710 and an All IP network 715. When a request to connect the mobile unit 200 is received (by dialing or receiving a call) (S27), the PLMN information 320, IMSI information 330, IP address 340 and User information 350 are transferred from the removable storage module 210 to the handset 205 for facilitating an initial cell search and to camp on the cell determined from the search (S28). A communication link between the mobile unit 200 and the UTRAN node 705 is established, and system information is sent from the UTRAN node 705 to the mobile unit 200 (S29A, S29B). In response, the mobile unit 200 sends a connection request including the stored IMSI information 330 to the UTRAN node 705 (S30). Once the connection is granted by the UTRAN node 705 (S31A, S31B), the mobile unit 200 may be used to request a transfer and/or connection to the Circuit Switched network 710 (S32A, S32B). Once the mobile unit 200 is connected to the Circuit Switched network 710, data may be transferred between the Circuit Switched network 710 and the mobile unit 200 (S33). The mobile unit 200 also sends a connection request including the stored IP address 340 and User information 350 to the All IP network 715 (S34). Once the connection is granted by the All IP network 715 (S35A, S35B), the transfer of data between the mobile unit 200 and the All IP network 505 may commence independent of other connections to circuit switched data (S36).

Figure 8:
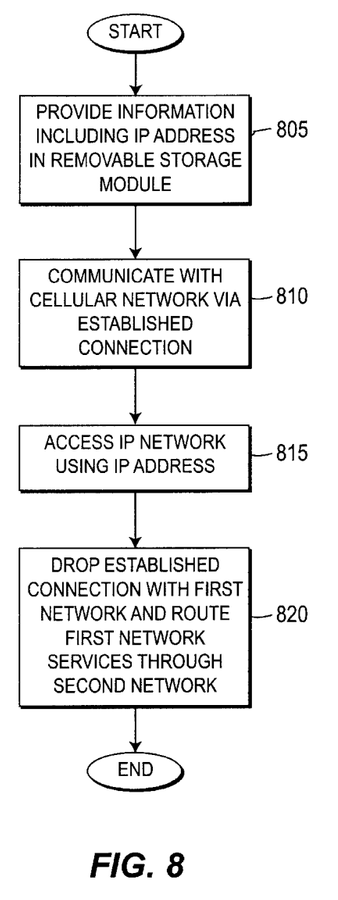
FIG. 8 is a flow chart illustrating the method steps for establishing communications between the mobile unit of FIG. 2 and a plurality of networks whereby existing services associated with one network are routed through another network in accordance with one embodiment of the present invention.

FIG. 8 is a flow chart illustrating method steps for implementing one embodiment of the present invention, whereby communications are established between a mobile unit 200 and a plurality of networks. The mobile unit 200 includes a removable storage module 210 having a unique storage module identity, as described herein. In step 805, information specific to a user is provided in the removable storage module 210. The information includes an IP address. In step 810, the mobile unit 200 communicates with a first one of said networks via an established connection. In step 815, the mobile unit 200 accesses a second one of the networks using the IP address. In step 820, the mobile unit 200 drops the established connection with the first network and routes existing services associated with the first network through the second network. The first network may be a cellular network and the second network may be an IP network.

Figure 9:
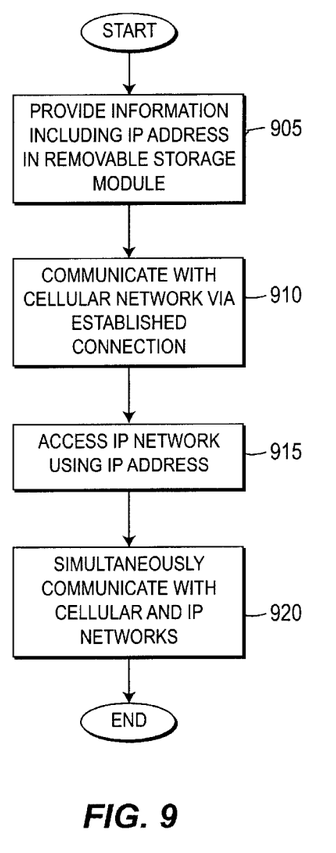
FIG. 9 is a flow chart illustrating the method steps for establishing simultaneous communications between the mobile unit of FIG. 2 and a plurality of networks in accordance with one embodiment of the present invention.

FIG. 9 is a flow chart illustrating method steps for implementing another embodiment of the present invention, whereby communications are established between a mobile unit 200 and a plurality of networks. The mobile unit 200 includes a removable storage module 210 having a unique storage module identity, as described herein. In step 905, information specific to a user is provided in the removable storage module 210. The information includes an IP address. In step 910, the mobile unit 200 communicates with a first one of said networks via an established connection. In step 915, the mobile unit 200 accesses a second one of the networks using the IP address. In step 920, the mobile unit 200 simultaneously communicates with the first and second networks. As shown in FIG. 9, the first network may be a cellular network and the second network may be an IP network.

The present invention has several key benefits over prior art systems. First, the IP address stored in the mobile unit 200 can be used in scenarios for handoff between a cellular system and a Wireless LAN (Local Area Network). Second, if the mobile unit 200 has an IP address with which it can be identified, then it is possible to connect to an IP-based network, such as the Internet, without going through a cellular network.

While the present invention has been described in terms of the preferred embodiment, other variations which are within the scope of the invention as outlined in the claims below will be apparent to those skilled in the art.

What is claimed is:

1. A mobile unit, comprising:
    user equipment (UE) configured to:
        establish a connection with a first network, comprising a cellular network, to receive services associated with the first network using an International Mobile Subscriber Identity (IMSI);
        establish a connection with a second network comprising an Internet Protocol (IP) based network; and
        while connected to both the first network and the second network, drop the connection with the first network and access the services associated with the first network through the second network.

2. A mobile unit as claimed in claim 1, further comprising a storage module to store at least one of an IP address to identify the user equipment on the second network, or the IMSI to identify the user equipment on the first network.

3. A mobile unit as claimed in claim 2, wherein the storage module comprises a subscriber identity module (SIM) or a Universal Telecommunication System (UMTS) Subscriber Identity Module (USIM).

4. A mobile unit as claimed in claim 2, wherein the storage module comprises a smart card.

5. A mobile unit as claimed in claim 1, wherein the second network is a packet switched (PS) network and the first network is a circuit switched (CS) network.

6. A mobile unit, comprising:
user equipment (UE) configured to:
- communicate with a first network via a connection to the first network to receive services associated with the first network, wherein the first network comprises a circuit switched network;
- change to receiving the services associated with the first network through a second network, wherein the second network comprises a packet switched network; and
- while connected to both the first network and the second network, drop the connection with the first network and continue to receive the services associated with the first network through the second network.

7. A mobile unit as claimed in claim 6, further comprising a storage module to store at least one of an IP address to identify the user equipment on the second network, or an IMSI to identify the user equipment on the first network.

8. A mobile unit as claimed in claim 7, wherein the storage module comprises a subscriber identity module (SIM) or a Universal Telecommunication System (UMTS) Subscriber Identity Module (USIM).

9. A mobile unit as claimed in claim 7, wherein the storage module comprises a smart card.

10. A method, comprising:
- establishing a connection between a user equipment (UE) and a first network, comprising a cellular network, using an International Mobile Subscriber Identity (IMSI);
- establishing a connection between the UE and a second network comprising an Internet Protocol (IP) based network; and
- while connected to both the first network and the second network, dropping the connection between the US and the first network and routing the services for the UE associated with the first network through the second network.

11. A method as claimed in claim 9, further comprising using an IP address to identify the UE on the first network, or using the IMSI to identify the UE on the second network.

12. A method as claimed in claim 10, further comprising identifying the UE from information stored on a subscriber identity module (SIM) or a Universal Telecommunication System (UMTS) Subscriber Identity Module (USIM).

13. A method as claimed in claim 10, wherein the second network is a packet switched (PS) network and the first network is a circuit switched (CS) network.

14. A method, comprising:
- communicating with a user equipment (UE) via a first network by providing services associated with the first network, wherein the first network comprises a circuit switched network;
- routing the services for the UE associated with the first network through a second network, wherein the second network comprises a packet switched network; and
- while connected to both the first network and the second network, dropping the connection with the first network and continuing to provide the services for the UE associated with the first network through the second network.

15. A method as claimed in claim 14, further comprising identifying the UE on the second network using an Internet Protocol (IP) address, or identifying the UE on the first network using an International Mobile Subscriber Identity (IMSI).

16. A method unit as claimed in claim 14, further comprising receiving information identifying the UE from a subscriber identity module (SIM) or a Universal Telecommunication System (UMTS) Subscriber Identity Module (USIM).

17. A method as claimed in claim 14, wherein the second network comprises an Internet Protocol (IP) network, and the first network comprises a cellular network.

18. A method as claimed in claim 14, wherein the second network comprises a wireless local area network (WLAN).

* * * * *